US008963988B2

(12) United States Patent
Vaisburd et al.

(10) Patent No.: US 8,963,988 B2
(45) Date of Patent: Feb. 24, 2015

(54) CAMERA MANIPULATION DURING A VIDEO CONFERENCE

(75) Inventors: Haim Vaisburd, Redwood City, CA (US); Yevgeni Litvin, Sunnyvale, CA (US); Xu Liu, San Jose, CA (US); Yuxin Liu, Cupertino, CA (US); Gary Chevsky, Palo Alto, CA (US)

(73) Assignee: TangoMe, Inc., Mountain View, CA (US)

( * ) Notice: Subject to any disclaimer, the term of this patent is extended or adjusted under 35 U.S.C. 154(b) by 272 days.

(21) Appl. No.: 13/618,789

(22) Filed: Sep. 14, 2012

(65) Prior Publication Data

US 2014/0078241 A1 Mar. 20, 2014

(51) Int. Cl.
*H04N 7/15* (2006.01)

(52) U.S. Cl.
USPC ........................................ 348/14.08

(58) Field of Classification Search
CPC ....... G06F 3/011; G06F 3/017; G06F 3/0425; G06F 3/044; G06F 2216/03; G06F 3/01; G06F 3/013; G06F 3/048; G06F 3/0481; G06F 3/04817; G06F 3/04842; G06F 3/04847; G06F 3/0488; H04N 5/23293
USPC ................ 348/14.01–14.09; 709/204, 217
See application file for complete search history.

(56) References Cited

U.S. PATENT DOCUMENTS

| | | | |
|---|---|---|---|
| 6,128,649 A * | 10/2000 | Smith et al. .................. 709/217 |
| 6,414,707 B1 | 7/2002 | Agraharam et al. |
| 6,831,676 B2 * | 12/2004 | Monroe ....................... 348/14.08 |
| 7,668,907 B1 * | 2/2010 | Janakiraman et al. ........ 709/204 |
| 7,707,247 B2 * | 4/2010 | Dunn et al. ................... 709/204 |
| 8,638,353 B2 | 1/2014 | Jeong et al. |
| 8,736,660 B2 * | 5/2014 | Rosenberg .................. 348/14.08 |
| 2003/0117487 A1 * | 6/2003 | Monroe ....................... 348/14.08 |
| 2007/0242066 A1 | 10/2007 | Levy Rosenthal |
| 2007/0248261 A1 * | 10/2007 | Zhou et al. ..................... 382/154 |
| 2010/0321469 A1 * | 12/2010 | Jeong et al. .................. 348/14.09 |
| 2011/0066684 A1 | 3/2011 | Dorso et al. |
| 2012/0206560 A1 | 8/2012 | Setton |
| 2013/0293486 A1 * | 11/2013 | Nave et al. .................... 345/173 |
| 2013/0328925 A1 * | 12/2013 | Latta et al. .................... 345/633 |
| 2014/0033052 A1 * | 1/2014 | KAUFMAN et al. ........ 715/733 |

FOREIGN PATENT DOCUMENTS

KR 20120006675 1/2012
WO WO 2005048600 A1 * 5/2005

OTHER PUBLICATIONS

"PCT/US2013/058313 International Search Report and Written Opinion", Dec. 16, 2013, 9 pages.

* cited by examiner

*Primary Examiner* — Mohammad Islam (57) ABSTRACT

A method and system for enabling a first device to change a viewed image of at least one of the first device and a second device, during a video conference, are disclosed. The method includes: receiving a manipulation instruction, at a first device, for a selected target image, wherein the selected target image includes a portion of images displayed on a display of the first device during a video conference with a second device; comparing the manipulation instruction to an instruction store; and changing, on at least one of the first device and the second device, a view of the selected target image according to the manipulation instruction to achieve a manipulated selected target image.

22 Claims, 9 Drawing Sheets

```
RECEIVE, AT A FIRST DEVICE, A MANIPULATION INSTRUCTION FOR A SELECTED TARGET IMAGE,
WHEREIN THE SELECTED TARGET IMAGE INCLUDES A PORTION OF IMAGES DISPLAYED ON A
DISPLAY SCREEN OF THE FIRST DEVICE DURING A VIDEO CONFERENCE WITH A SECOND DEVICE
705

RECEIVE A ZOOM MANIPULATION INSTRUCTION FOR THE SELECTED TARGET IMAGE
    710
        RECEIVE MULTIPLE TOUCHES AT THE SELECTED TARGET IMAGE, WHEREIN THE MULTIPLE
        TOUCHES OCCUR AT A SUBSTANTIALLY SIMILAR PERIOD OF TIME FOR A PREDETERMINED
        PERIOD OF TIME
        715

RECEIVE THE MULTIPLE TOUCHES, WHEREIN THE MULTIPLE TOUCHES MOVE IN A
        SUBSTANTIALLY OPPOSITE DIRECTION FROM EACH OTHER DURING THE PREDETERMINED
        PERIOD OF TIME
        720

RECEIVE A RE-FOCUSING MANIPULATION INSTRUCTION FOR THE SELECTED TARGET IMAGE
    725
        RECEIVE AT LEAST ONE TOUCH AT THE SELECTED TARGET IMAGE
        730
        RECEIVE A PLURALITY OF TOUCHES AT THE SELECTED TARGET IMAGE, WHEREIN THE
        PLURALITY OF TOUCHES OCCURS SEQUENTIALLY WITHIN A PREDETERMINED PERIOD OF
        TIME
        735

RECEIVE A SUPER RESOLUTION FOCUSING MANIPULATION INSTRUCTION FOR THE SELECTED
    TARGET IMAGE
    740
        RECEIVE AN INDICATION THAT THE AT LEAST ONE OF THE FIRST AND SECOND DEVICE IS
        FOCUSING ON THE SELECTED TARGET IMAGE FOR A PREDETERMINED PERIOD OF TIME,
        WHEREIN THE SELECTED TARGET IMAGE INCLUDES THE IMAGES DISPLAYED ON THE
        DISPLAY SCREEN, AND WHEREIN THE SELECTED TARGET IMAGE REMAINS STATIC DURING
        THE FOCUSING
        745

# CAMERA MANIPULATION DURING A VIDEO CONFERENCE

BACKGROUND

Participants in a video conference communicate with one another by transmitting audio/video signals to one another. For example, participants are able to interact via two-way video and audio transmissions simultaneously. However, the participants may not be able to completely articulate what they are attempting to communicate to one another based solely on the audio captured by microphones and video signals captured by video cameras.

DESCRIPTION OF EMBODIMENTS

The drawings referred to in this description should be understood as not being drawn to scale except if specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

As will be described below, embodiments enable participants in a two way video conference to manipulate the local camera and/or the peer's camera to show a special object or to see a special object. The manipulation includes, but is not limited to, the following: enlarging a selected region of the display (which displays the images captured by a camera); and focusing in on selected regions of the display (either the entire display screen or a portion less than the whole of the display screen).

Overview of Discussion

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
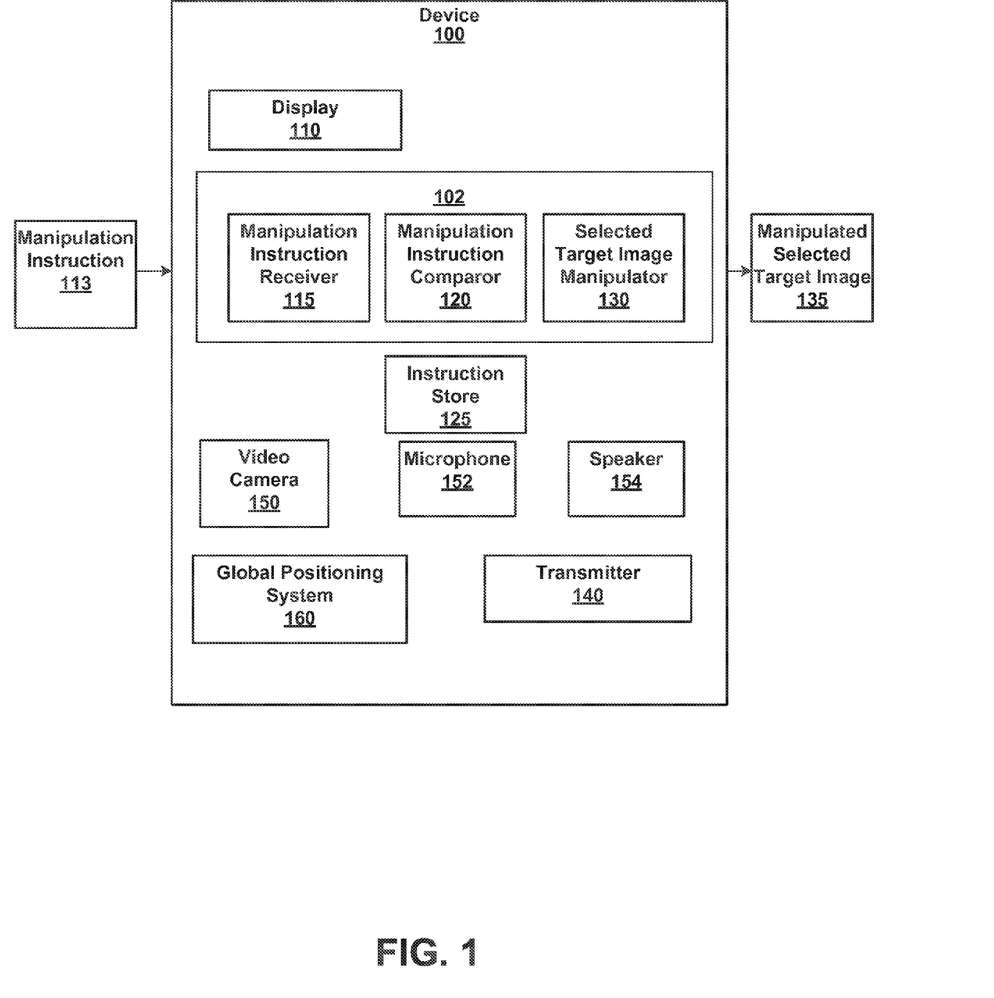
FIGS. 1, 2A, 2B and 3 illustrate examples of devices, in accordance with an embodiment.
Figure 2A:
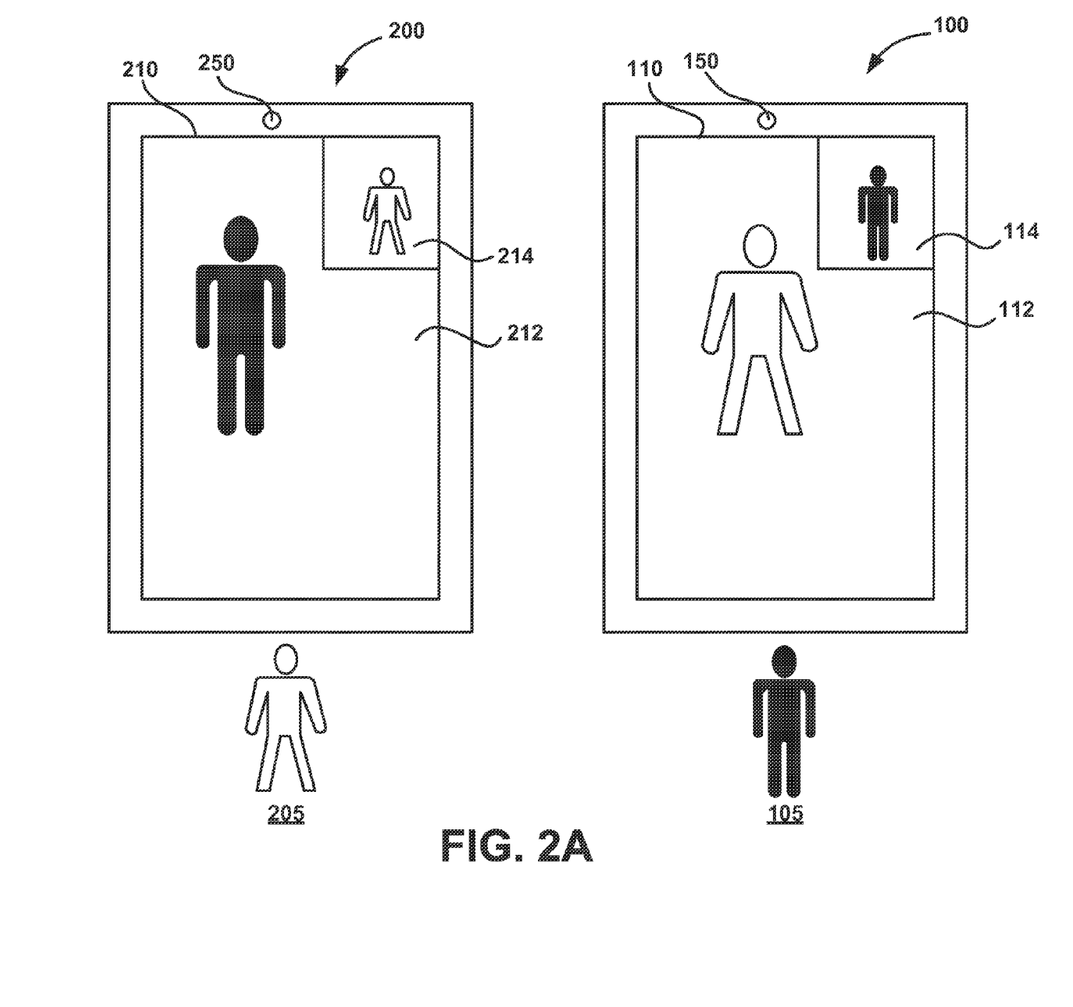
Figure 2B:
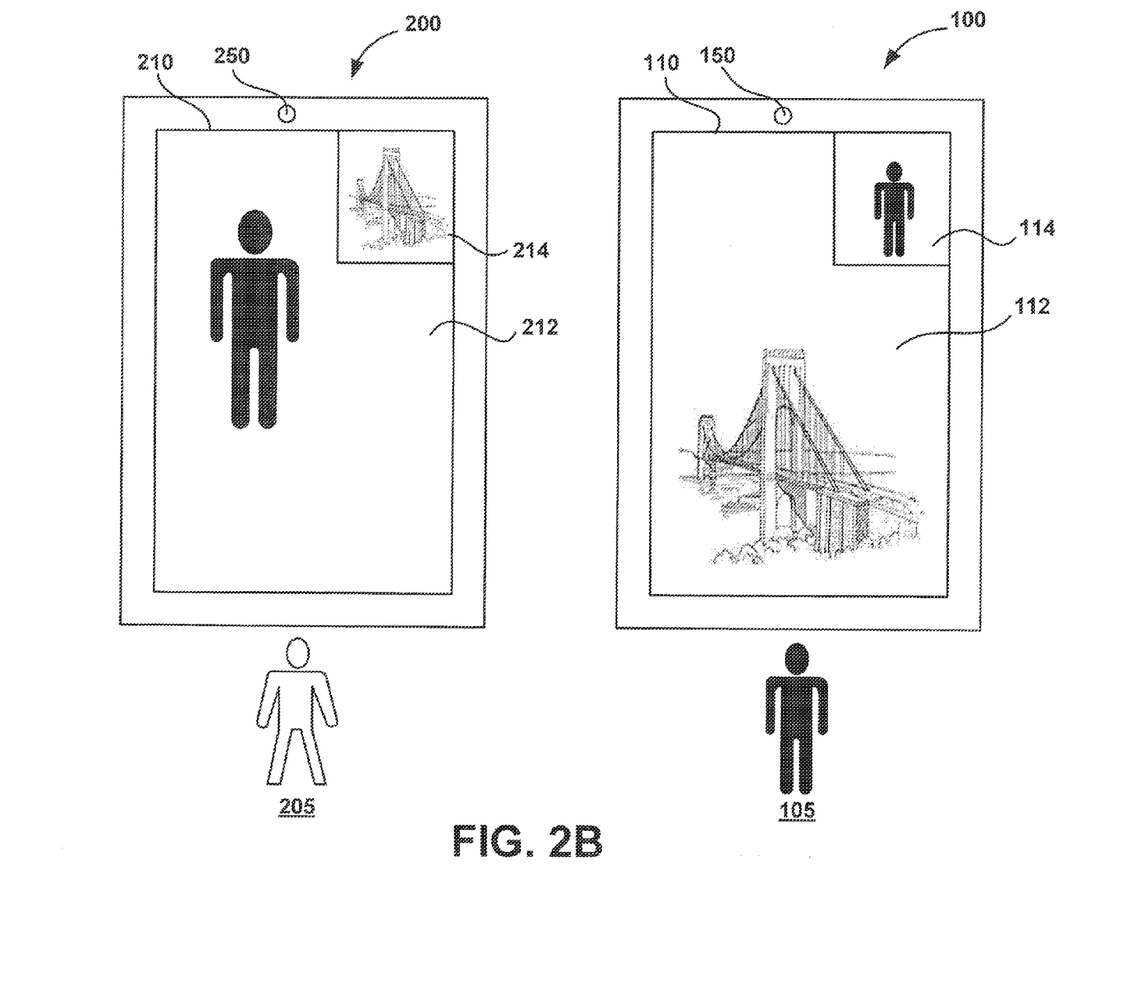

FIG. 1 depicts an embodiment of device 100. Device 100 is configured for participation in a video conference. FIGS. 2A and 2B depict devices 100 and 200 participating in a video conference. In general, video conferencing allows two or more locations to interact via multi-way video and audio transmissions simultaneously.

The discussion below will first describe the components of device 100. The discussion will then describe the functionality of the components of device 100 during a video conference between devices 100 and 200. Devices 100 and 200 are any communication devices (e.g., laptop, desktop, smartphones, tablets, TV, etc.) capable of participating in a video conference. In various embodiments, device 100 is a handheld mobile device, such as smart phone, personal digital assistant (PDA), and the like.

Moreover, for clarity and brevity, the discussion will focus on the components and functionality of device 100. However, device 200 operates in a similar fashion as device 100. In one embodiment, device 200 is the same as device 100 and includes the same components as device 100.

In one embodiment, device 100 is coupled with system 102. System 102 includes, according to embodiments: a manipulation instruction receiver 115, a manipulation instruction comparor 120; and a selected target image manipulator 130. Device 100 and/or system 102, is further coupled with, in various embodiments, the following components: a display 110; a transmitter 140; a video camera 150; a microphone 152; a speaker 154; an instruction store 125; and a global positioning system 160.

Display 110 is configured for displaying video captured at device 200. In another embodiment, display 110 is further configured for displaying video captured at device 100.

Transmitter 140 is for transmitting data (e.g., control code).

The video camera 150 captures video at device 100. The microphone 152 captures audio at device 100. The speaker 154 generates an audible signal at device 100.

The global positioning system 160 determines a location of a device 100.

Referring now to FIGS. 2A and 2B, devices 100 and 200 are participating in a video conference with one another, in accordance with an embodiment. In various embodiments, more than two devices participate in a video conference with each another.

During the video conference, video camera 250 captures video at device 200. For example, video camera 250 captures video of user 205 of device 200.

Video camera 150 captures video at device 100. For example, video camera 150 captures video of user 105. It should be appreciated that video cameras 150 and 250 can capture any objects that are within the respective viewing ranges of cameras 150 and 250. (See discussion below with reference to FIG. 2B.)

Microphone 152 captures audio signals corresponding to the captured video signal at device 100. Similarly, a microphone of device 200 captures audio signals corresponding to the captured video signal at device 200.

In one embodiment, the video captured at device 200 is transmitted to and displayed on display 110 of device 100. For example, a video of user 205 is displayed on a first view 112 of display 110. Moreover, the video of user 205 is displayed on a second view 214 of display 210.

The video captured at device 100 is transmitted to and displayed on display 210 of device 200. For example, a video of user 105 is displayed on first view 212 of display 210. Moreover, the video of user 105 is displayed on a second view 114 of display 110.

In one embodiment, the audio signals captured at devices 100 and 200 are incorporated into the captured video. In another embodiment, the audio signals are transmitted separate from the transmitted video.

As depicted, first view 112 is the primary view displayed on display 110 and second view 114 is the smaller secondary view displayed on display 110. In various embodiments, the size of both the first view 112 and the second view 114 are adjustable. For example, the second view 114 can be enlarged to be the primary view and the first view 112 can be diminished in size to be the secondary view (second view 114). Moreover, either one of views, first view 112 and second view 114 can be closed or fully diminished such that it is not viewable.

With reference now to FIG. 2B, the user 205 of device 200 is capturing the image of a bridge 260 (instead of capturing an image of himself/herself 205), which is within the viewing range of video camera 250. The image of the bridge is depicted at second view 214 of device 200, and at a first view 112 of device 100. As will be shown, the user 105, in accordance with embodiments, is able to manipulate the video camera 250 of device 200, such that the image displayed in the second view 214 (the bridge) and the first view 112 is changed from its original depiction (e.g. enlarged, re-focused, presented with a higher resolution).

With reference again to FIG. 1, manipulation instruction receiver 115 receives, at a first device (e.g., device 100), a manipulation instruction 113 for a selected target image, wherein the selected target image includes a portion of images displayed on a display 110 of the first device during a video teleconference with a second device (e.g., device 200 discussed below). It should be appreciated that in one embodiment, the device 100 is the first device and device 200 is the second device. However, in another embodiment, device 100 is the second device and device 200 is the first device. It should also be appreciated that the portion of the images that is selected as the target image that is to be manipulated may be a portion less than the whole (or the whole) of the images that are displayed on the display 110. The selection of the selected target image is communicated to a first device by a user of the first device or the user of a second device (different from the first device) capable of communicating with the first device.

The manipulation instruction comparor 120 compares the manipulation instruction 113 to an instruction store 125. The instruction store 125 includes a set (e.g., one or more) of stored manipulation instructions.

When the manipulation instruction comparor 120 determines that the manipulation instruction 113 corresponds to a stored manipulation instruction of a set of stored manipulation instructions, then the selected target image manipulator 130 changes, on the first device and/or the second device, the view of the selected target image according to the manipulation instruction 113, thereby achieving a manipulated selected target image 135. The term, "correspond", in the context of embodiments, refers to the manipulation instruction 113 matching a stored manipulation instruction, thereby verifying that the intended instructions given to either the first and/or second device was intended to select a target image to be manipulated and confirms the manner of manipulation that is intended (as will be described below).

Figure 3:
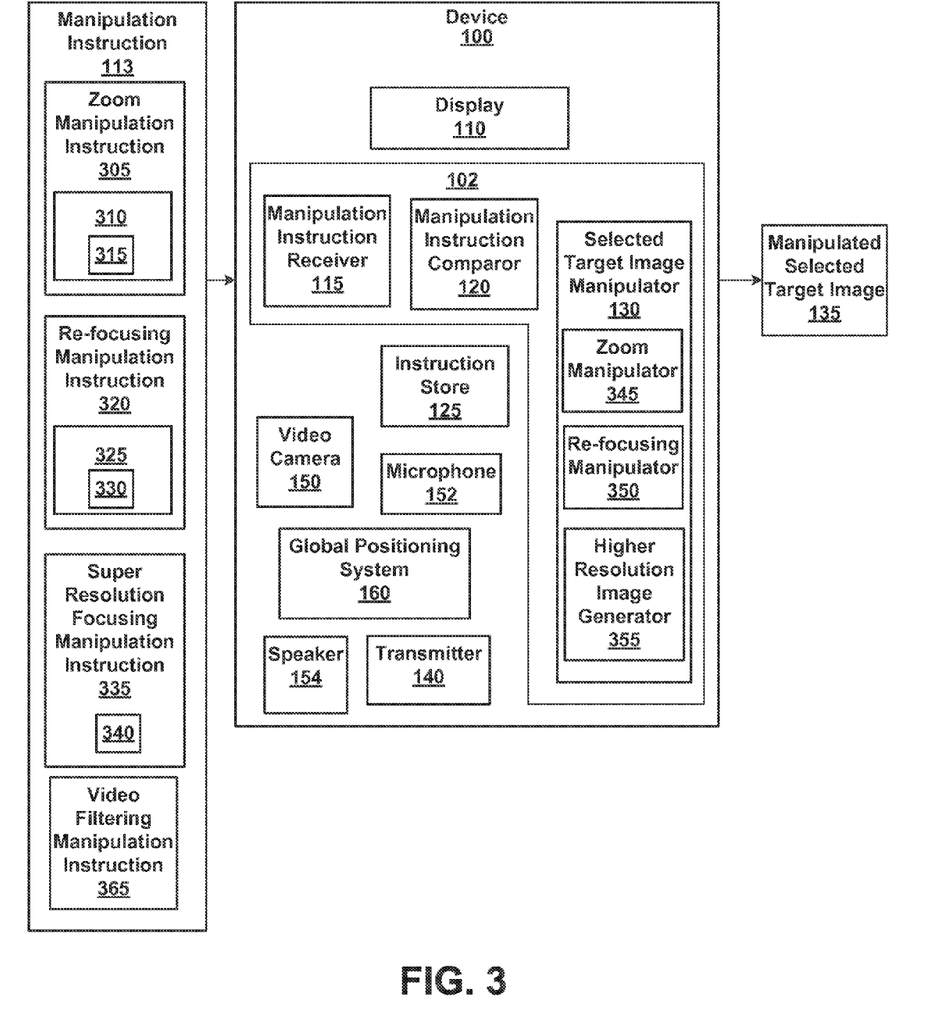
Figure 4:
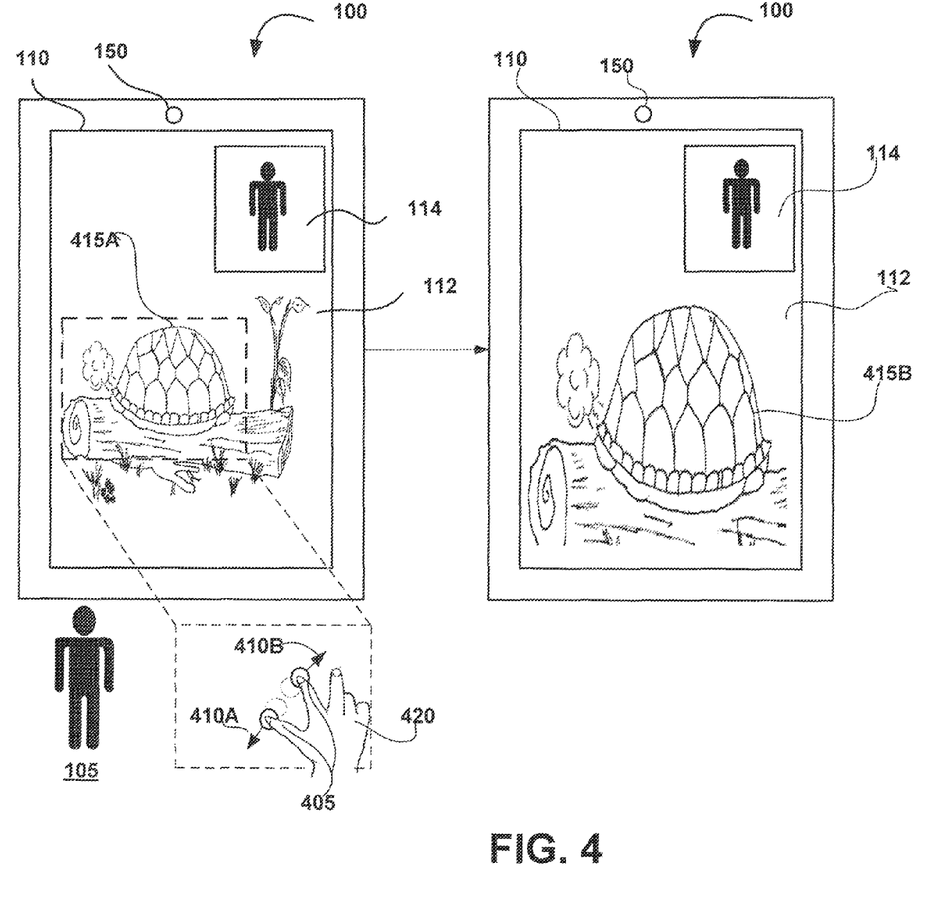
FIG. 4 illustrates an example of enlarging an image, in accordance with an embodiment.

With reference now to FIG. 3, the manipulation instruction 113 of system 102 optionally includes the following types of instructions: a zoom manipulation instruction 305; a re-focusing manipulation instruction 320; a super resolution focusing manipulation instruction 335; and a video filtering manipulation instruction 365. In one embodiment, the zoom manipulation instruction 305 includes multiple touches 310 received at the selected target image, wherein the multiple touches are received at a substantially similar period of time. With reference now to FIG. 4, an example of a zoom manipulation instruction 305 being given by a user of device 100 is shown in accordance with an embodiment.

With reference now to FIGS. 1-4, FIG. 4 shows a device 100 being operated by user 105. On the display of the device 100, in the first view 112, is an image of a turtle 415A sitting on a log. (Referring The image of the turtle 415A in the first view 112 is the same image that appears in the first view 212 of the second device 200 being operated by the user 205.) In one embodiment, the user 105 wishes to zoom-in on the turtle 415, thereby enlarging the image of the turtle 415A. The user 105, in one embodiment, touches the display 110 near or over the image of the turtle 415A with multiple inputs (e.g., fingers, styles, etc.) 405 (showing the thumb and the index finger of hand 420 touching the display 110 near or over the image of the turtle 415A) for a substantially similar period of time, such that the inputs remain on the display 110 for the same length of time or near to the same length of time (according to a preprogrammed length of time). In one embodiment, the user 105 then moves his/her inputs 405 (thumb and index fingers) outward and in a substantially opposite direction from each other, as illustrated by arrows 410A and 410B, signifying movement by the inputs.

The manipulation instruction comparor 120 then compares the zoom manipulation instruction 305 to the instruction store 125. If the zoom manipulation instruction 305 corresponds to a manipulation instruction 113 that is stored (and hence pre-programmed into device 100) in the instruction store 125, then the zoom manipulation instruction 305 is used to enlarge the selected target image via the selected target image manipulator 130.

The selected target image manipulator 130 optionally includes: a zoom manipulator 345; a re-focusing manipulator 350; and a higher resolution image generator 355.

The zoom manipulator 345 changes, on at least one of the first device and the second device (such as device 100 and device 200, respectively), a view of the selected target image according to the manipulation instruction 113 to achieve a manipulated selected target image 135. For example, the combination of multiple touches 310 to the display 110 and outward movement 410A and 410B in an opposite direction from each other 315 functions, via the zoom manipulator 345, to enlarge the image of the turtle 425A in proportion to the amount of outward movement given by the inputs 405, to achieve the enlarged turtle image 415B. (For example, a small amount of outward movement will enlarge the turtle 415A by a small amount, whereas a large amount of outward movement will enlarge the turtle 415A a large amount.) As can be seen in FIG. 4, the selected target image manipulator 130 generates an enlarged image of the turtle 415B in response to the zoom manipulation instruction 305.

In another embodiment, the user 105, in one embodiment, touches the display 110 near or over the image of the turtle 415A with multiple inputs (e.g., fingers, styles, etc.) for a substantially similar period of time, such that the inputs remain on the display screen for the same length of time or near to the same length of time (according to a preprogrammed length of time). The user 105 then moves his/her inputs 405 (thumb and index fingers) inward and in a substantially opposite direction towards each other (not shown). This combination of multiple touches to the display 110 and inward movement in an opposite direction from each other functions, via the selected target image manipulator 130, to shrink the image of the turtle 415 in proportion to the amount of inward movement given by the inputs, if the manipulation instruction comparor 120 determines that the manipulation instruction 305 to shrink the image of the turtle 415A corresponds to preprogrammed manipulation instructions found in the instruction store 125.

As stated herein, in one embodiment, the manipulation instruction 113 optionally includes a re-focusing manipulation instruction 320. The re-focusing manipulation instruction instructs the device to provide a clearer image of the selected target image. In one embodiment, the re-focusing manipulation instruction 320 optionally includes at least one touch 325 at the selected target image. In one embodiment, the at least one touch 325 optionally includes a plurality of touches 330 performed at the selected target image, wherein the plurality of touches 330 occurs sequentially within a predetermined period of time. For example, a user may tap the display 110 two times (plurality of touches 330), sequentially, within a ½ second time period (the device 10 being preprogrammed to interpret two sequential touches occurring within ½ a second as signifying a re-focusing manipulation instruction 320, as determined by the manipulation instruction comparor 120).

Figure 5:
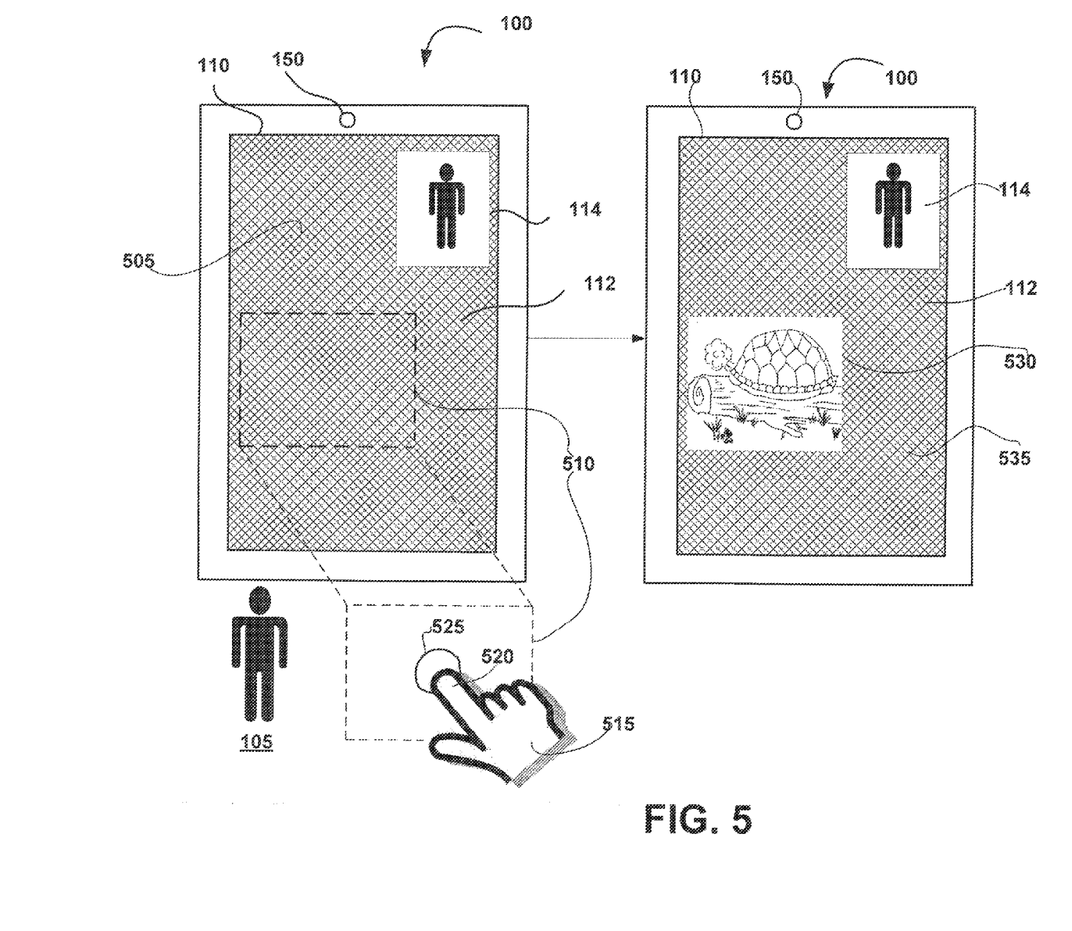
FIG. 5 illustrates an example of re-focusing an image, in accordance with an embodiment.

With reference now to FIG. 5, an example of a re-focusing manipulation instruction 320 being given by a user 105 of device 100 is shown in accordance with an embodiment. FIG. 5 shows a device having a camera 150, a first view 112, and a second view 114. The first view 112 on the display 110 of the device 100 shows a blurred image 505 represented by diagonal cross-hatching lines. The user 105 uses his/hers input (e.g. index finger 520 of his/her hand 515) to tap on position 525 which is centered over the blurred image of a turtle on a log appearing with the boxed area 510 (which signifies the area which the user 105 intends to be re-focused and clarified to display a clearer image [e.g., more clear than the blurred image appearing on the display 110]). In FIG. 5, the user 105 touches the display 110 once. The manipulation instruction comparor 120 compares the re-focusing manipulation instruction 320 with the manipulation instruction(s) stored in the instruction store 125. If the re-focusing manipulation instruction 320 is found to correspond to a manipulation instruction 113 in the instruction store 125, then the re-focusing manipulator 350 changes, on at least one of the first device and the second device (e.g. device 100 and device 200, respectively), a view of the selected target image according to the re-focusing manipulation instruction 320 to achieve a manipulated selected target image 135.

In one embodiment, the manipulation instruction 113 optionally includes a super resolution focusing manipulation instruction 320. The super resolution focusing manipulation instruction 320 instructs the device to provide a clearer image (higher resolution) of all the images displayed on the display 110. In one embodiment, the super resolution focusing manipulation instruction 335 optionally includes at an indication 340 that at least one of the first and the second device is focusing on the selected target image for a predetermined period of time, wherein the selected target image includes the images displayed on the display 110 (i.e. all of the images displayed on the display 110), and wherein the selected target image remains static during the focusing. For example, the user 105 may hold the device 100 such that the camera 150 is focused on one site containing a static scene, for a period of time that is recognized by the device 100 as a super resolution manipulation instruction 335.

In one embodiment, the manipulation instruction 113 optionally includes a video filtering manipulation instruction 365. The video filtering manipulation instruction 365 instructs the device to filter the video of the selected target image such that the overall view of the selected target image provides an old movie effect, an over exposed effect, a color saturated effect, etc.

Figure 6:
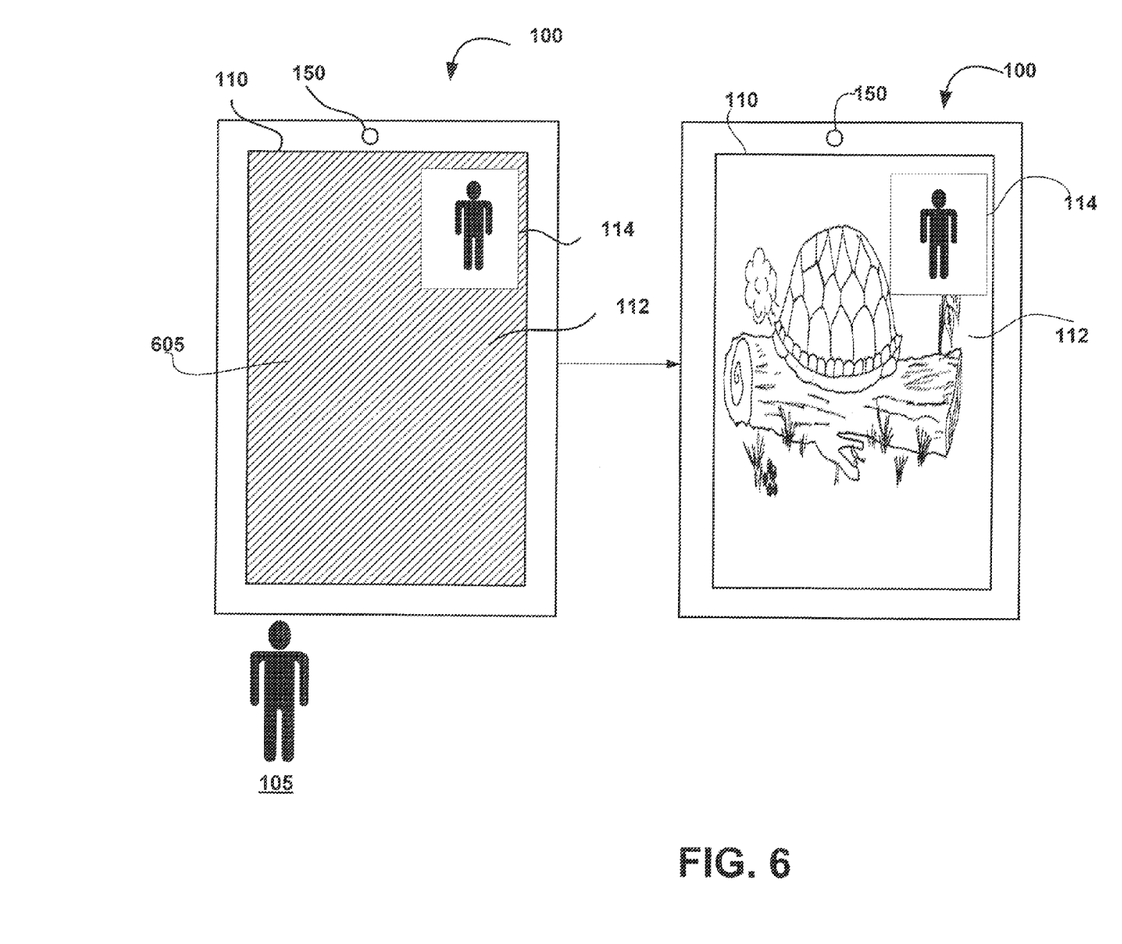
FIG. 6 illustrates an example of increasing frame resolution, in accordance with an embodiment.

With reference now to FIG. 6, an example of a super resolution manipulation instruction 335 being given by a user 105 of device 100 is shown in accordance with an embodiment. FIG. 6 shows a device having a camera 150, a first view 112, and a second view 114. The first view 112 on the display 110 of the device 100 shows a blurred image 605 represented by diagonal lines. The user 105 holds the device 100 such that the camera 150 focuses on the same image that is static for a predetermined period of time (a preprogrammed period of time which that device 100 recognizes as signifying a super resolution manipulation instruction 335, as determined by the manipulation instruction comparor 120).

The manipulation instruction comparor 120 compares the super resolution focusing manipulation instruction 335 with the manipulation instruction(s) stored in the instruction store 125. If the super resolution focusing manipulation instruction 335 is found to correspond to a manipulation instruction 113 in the instruction store 125, then the higher resolution image generator 355 generates a higher resolution image of the selected target image in response to the super resolution focusing manipulation instruction 335, to achieve the manipulated selected target image 135.

While a manipulation instruction 113, such as a zoom manipulation instruction 305, a re-focusing manipulation instruction 320, and a super resolution manipulation instruction 335 are described herein, it should be appreciated that embodiments include a manipulation instruction 335 that varies from those described herein. The following is a description of various embodiments including varying manipulation instructions having varying selected target image manipulators (also including embodiments already discussed herein): touching and sliding multiple points on the display 110 to zoom a local camera (e.g. device 100); touching and sliding multiple points on the display 110 to zoom a peer's camera (e.g. device 200); double tapping on a local view of a local display 110 to zoom a local camera, and then double tapping again on the display 110 to restore the original image appearing on that display 110; double tapping on a peer's view of a local display 110 to zoom the peer's camera, and then double tapping again on the peer's view on the display 110 to restore the original image of the peer's view appearing on that display 110; touching a single point on the display 110 and re-focusing the peer's camera at the point touched (enabled by the combination of embodiments described herein, camera focus point change technology, and region of interest coding technology [allowing video stream to allocate more bits at a region of interest]); touching a single point on the display 110 and re-focusing the local camera at the point touched (enabled by the combination of embodiments described herein, camera focus point change technology, and region of interest coding technology): holding the device (e.g., first device) steady at a static scene and sending a peer a high resolution picture of the image; pressing a button on the device to take a high resolution picture of a peer; pressing a button on the device to send a high resolution picture of a local person (e.g. the user 105 of the device 100) to a peer; (wherein there is no bandwidth change, frame rate can be traded for resolution) pressing and holding a local view, and sending a low frame rate but high resolution video to a peer (can be triggered by any user explicit method); and (wherein there is no bandwidth change, frame rate can be traded for resolution) pressing and holding a peer's view, and receiving a low frame rate but high resolution video of the peer's view (can be triggered by any user explicit method).

Figure 7A:
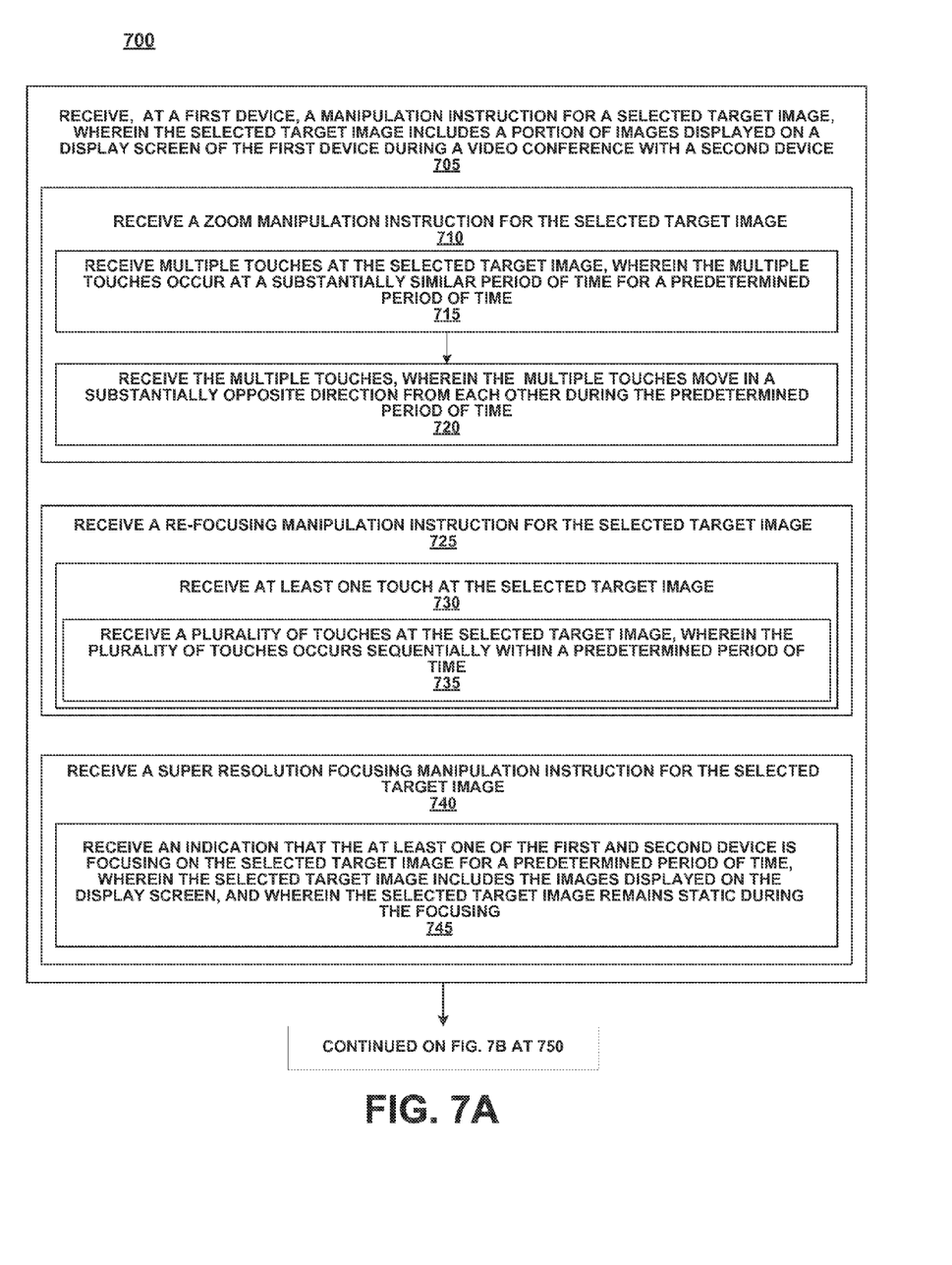
FIGS. 7A and 7B is a flow chart of a method for enabling a first device to change a viewed image of at least one of the first device and a second device during a video conference, in accordance with an embodiment.
Figure 7B:
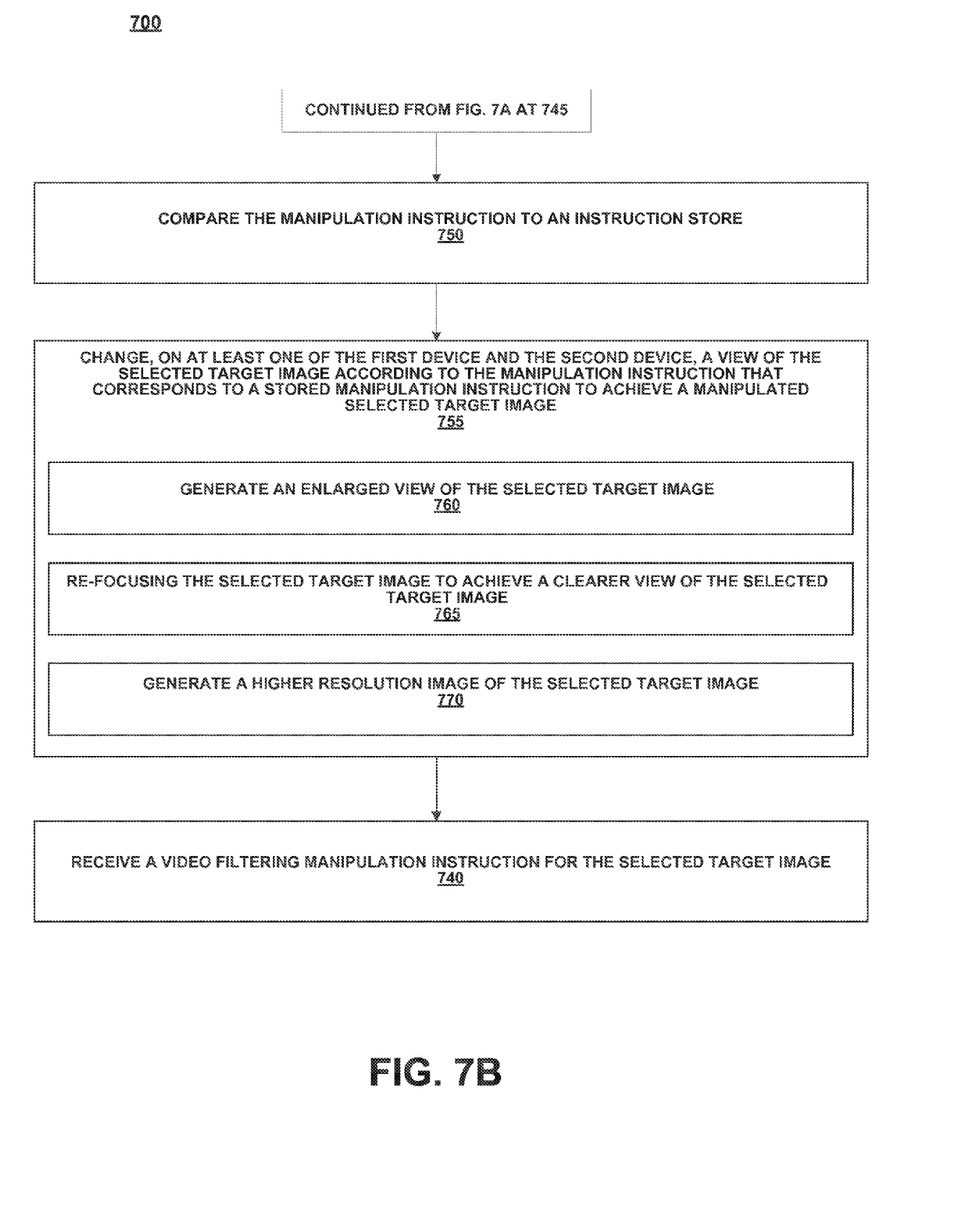

FIGS. 7A and 7B depict a flow chart of method 700 for enabling a first device to change a viewed image of at least one of the first device and a second device, during a video conference, in accordance with embodiments, respectively. In various embodiments, method 700 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 700 is performed by devices 100 and/or device 200, as described in FIGS. 1, 2A and 2B.

With reference now to FIGS. 1-7B, at 705 of method 700, in one embodiment and as described herein, a manipulation instruction 113 is received at a first device (e.g. device 100) for a selected target image, wherein the selected target image includes a portion of images displayed on the display 110 of the first device during a video conference with a second device (e.g. device 200).

At 710 of step 705, in one embodiment and as discussed herein, the zoom manipulation instruction 305 for the selected target image is received. At 715 of step 710, in one embodiment and as described herein, multiple touches at the selected target image are received, wherein the multiple touches occur at a substantially similar period of time for a predetermined period of time. At 720 of step 710, in one embodiment and as described herein, the multiple touches are received, wherein the multiple touches move in a substantially opposite direction from each other during the predetermined period of time.

At 725 of step 705, in one embodiment and as discussed herein, the re-focusing manipulation instruction 320 for the selected target image is received. At 730 of step 725, in one embodiment and as discussed herein, at least one touch at the selected target image is received. At 735 of step 730, in one embodiment and as discussed herein, a plurality of touches at the selected target image is received, wherein the plurality of touches occurs sequentially within a predetermined period of time.

At 740 or step 705, in one embodiment and as discussed herein, the super resolution focusing manipulation instruction 335 for the selected target image is received. At 745 of step 740, in one embodiment and as discussed herein, the indication 340 that the at least one of the first and the second device is focusing on the selected target image for a predetermined period of time is received, wherein the selected target image includes the images displayed on the display 110, and wherein the selected target image remains static during the focusing. At 775, in one embodiment and as described herein, the video filtering instruction 365 is received.

At 750, in one embodiment and as discussed herein, the manipulation instruction 113 is compared to an instruction store 125.

At 755, in one embodiment and as discussed herein, on at least one of the first device and the second device, a view of the selected target image is changed according to the manipulation instruction 113 that corresponds to a stored manipulation instruction (in the instruction store 125) to achieve the manipulated selected target image 135. At 760 of step 755, in one embodiment and as discussed herein, the selected target image is enlarged to achieve an enlarged view of the selected target image. At 765 of step 755, in one embodiment and as discussed herein the selected target image is re-focused to achieve a clearer view of the selected target image. At 770 of step 755, in one embodiment and as discussed herein, a higher resolution image of the selected target image is generated.

Thus, an embodiment enables the user of a mobile phone during a video conference with a peer using another mobile phone, to easily change the camera view of the peer's mobile phone in order to enlarge a portion of the image and/or make a portion of the image clearer. As discussed herein, while embodiments have been described in the context of a user 105 manipulating the view of the video camera 250 of the device 200, it should be appreciated that user 105 may also manipulate his/her own camera 150 and hence view of an image, and user 205 may manipulate the camera 150 of device 100 and well as his/her own video camera 250.

All statements herein reciting principles, aspects, and embodiments of the technology as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present technology, therefore, is not intended to be limited to the embodiments shown and described herein. Rather, the scope and spirit of present technology is embodied by the appended claims.

The invention claimed is:

1. A non-transitory computer readable storage medium having stored thereon, computer-executable instructions that, when executed by a computer, cause said computer to perform a method for enabling a first device to change a viewed image of at least one of said first device and a second device, during a video conference, wherein said method comprises:
   receiving, at a first device, a manipulation instruction for a selected target image, wherein said selected target image comprises a portion of images displayed on a display screen of said first device during a video teleconference with a second device;
   comparing said manipulation instruction to an instruction store; and
   changing, on at least one of said first device and said second device, a view of said selected target image according to said manipulation instruction that corresponds to a stored manipulation instruction to achieve a manipulated selected target image.

2. The non-transitory computer readable storage medium of claim 1, wherein said receiving, at a first device, said manipulation instruction for a selected target image comprises:
   receiving a zoom manipulation instruction for said selected target image.

3. The non-transitory computer readable storage medium of claim 2, wherein said receiving a zoom manipulation instruction for said selected target image comprises:

receiving multiple touches at said selected target image, wherein said multiple touches occur at a substantially similar period of time for a predetermined period of time.

4. The non-transitory computer readable storage medium of claim 3, wherein said method further comprises:
receiving said multiple touches, wherein said multiple touches move in a substantially opposite direction from each other during said predetermined period of time.

5. The non-transitory computer readable storage medium of claim 1, wherein said receiving, at a first device, said manipulation instruction for a selected target image comprises:
receiving a re-focusing manipulation instruction for said selected target image.

6. The non-transitory computer readable storage medium of claim 5, wherein said receiving a re-focusing manipulation instruction for said selected target image comprises:
receiving at least one touch at said selected target image.

7. The non-transitory computer readable storage medium of claim 6, wherein said receiving at least one touch at said selected target image comprises:
receiving a plurality of touches at said selected target image, wherein said plurality of touches occurs sequentially within a predetermined period of time.

8. The non-transitory computer readable storage medium of claim 1, wherein said receiving, at a first device, said manipulation instruction for a selected target image comprises:
receiving a super resolution focusing manipulation instruction for said selected target image.

9. The non-transitory computer readable storage medium of claim 8, wherein said receiving a super resolution focusing manipulation instruction for said selected target image comprises:
receiving an indication that said at least one of said first and second device is focusing on said selected target image for a predetermined period of time, wherein said selected target image comprises said images displayed on said display screen, and wherein said selected target image remains static during said focusing.

10. The non-transitory computer readable storage medium of claim 1, wherein said receiving, at a first device, said manipulation instruction for a selected target image comprises:
receiving a video filtering instruction for said selected target image.

11. The non-transitory computer readable storage medium of claim 1, wherein said changing, on at least one of said first device and said second device, a view of said selected target image according to said manipulation instruction comprises:
generating an enlarged view of said selected target image.

12. The non-transitory computer readable storage medium of claim 1, wherein said changing, on at least one of said first device and said second device, a view of said selected target image according to said manipulation instruction comprises:
re-focusing said selected target image to achieve a clearer view of said selected target image.

13. The non-transitory computer readable storage medium of claim 1, wherein said changing, on at least one of said first device and said second device, a view of said selected target image according to said manipulation instruction comprises:
generating a higher resolution image of said selected target image.

14. A system for enabling a first device to change a viewed image of at least one of said first device and a second device, during a video teleconference, wherein said system comprises:
a manipulation instruction receiver coupled with a computer, said manipulation instruction receiver configured for receiving, at a first device, a manipulation instruction for a selected target image, wherein said selected target image comprises a portion of images displayed on a display screen of said first device during a video conference with a second device:
a manipulation instruction comparor coupled with said computer, said manipulation instruction comparer configured for comparing said manipulation instruction to an instruction store; and
a selected target image manipulator coupled with said computer, said selected target image manipulator configured for changing, on at least one of said first device and said second device, a view of said selected target image according to said manipulation instruction to achieve a manipulated selected target image.

15. The system of claim 14, wherein said manipulation instruction comprises:
a zoom manipulation instruction.

16. The system of claim 15, wherein said zoom manipulation instruction comprises:
multiple touches received at said selected target image, wherein said multiple touches are received at a substantially similar period of time.

17. The system of claim 14, wherein said manipulation instruction comprises:
a re-focusing manipulation instruction.

18. The system of claim 14, wherein said manipulation instruction comprises:
a super resolution focusing manipulation instruction.

19. The system of claim 14, wherein said manipulation instruction comprises:
a video filtering instruction.

20. The system of claim 14, wherein said system further comprises:
a zoom manipulator configured for generating an enlarged image of said selected target image in response to a zoom manipulation instruction.

21. The system of claim 14, wherein said system further comprises:
a re-focusing manipulator configured for generating a clearer image of said selected target image in response to a re-focusing manipulation instruction.

22. The system of claim 14, wherein said system further comprises:
a higher resolution image generator configured for generating a higher resolution image of said selected target image in response to a super resolution focusing manipulation instruction.

* * * * *

UNITED STATES PATENT AND TRADEMARK OFFICE
CERTIFICATE OF CORRECTION

| | |
|---|---|
| PATENT NO. | : 8,963,988 B2 |
| APPLICATION NO. | : 13/618789 |
| DATED | : February 24, 2015 |
| INVENTOR(S) | : Haim Vaisburd et al. |

It is certified that error appears in the above-identified patent and that said Letters Patent is hereby corrected as shown below:

In the Claims

Column 10, Claim 14, Line 15, Delete: "device:"

Insert: --device;--

Signed and Sealed this
Twenty-third Day of June, 2015

Michelle K. Lee
*Director of the United States Patent and Trademark Office*